United States Patent [19]

Pano et al.

[11] Patent Number: 5,076,738
[45] Date of Patent: Dec. 31, 1991

[54] CUTTING TOOL ASSEMBLY

[75] Inventors: Joseph Pano, Nahariya, Israel; Hendrikus Antonius X. van de Voort, Someren, Netherlands

[73] Assignee: Duracarb b.v., Parallelweg, Netherlands

[21] Appl. No.: 579,541

[22] Filed: Sep. 10, 1990

[30] Foreign Application Priority Data

Sep. 12, 1989 [NL] Netherlands .......................... 8902275

[51] Int. Cl.⁵ ............................................... B23P 15/28
[52] U.S. Cl. .................................... 407/110; 407/117; 407/102
[58] Field of Search ................................ 407/101–105, 407/107–110, 117

[56] References Cited

U.S. PATENT DOCUMENTS 4,801,224  1/1989  Pettersson et al. ................. 407/110
4,909,677  3/1990  Noguchi et al. ..................... 407/110

Primary Examiner—Larry I. Schwartz
Assistant Examiner—Julie R. Daulton
Attorney, Agent, or Firm—Burgess, Ryan & Wayne

[57] ABSTRACT

A cutting tool assembly wherein a replaceable cutting insert is clampingly held between a pair of clamping jaws of an insert holder which are respectively provided with pairs of clamping surfaces one pair of clamping surfaces being of uniformly curved cross-sectional shape, while the other pair of clamping surfaces being of non-uniformly curved cross-sectional shape; the arrangement being such that when the insert is clamped between the jaws the respective clamping surfaces contact each other along discrete, axially directed locations which are symmetrically disposed with respect to and axially spaced from a median plane of the insert.

8 Claims, 2 Drawing Sheets

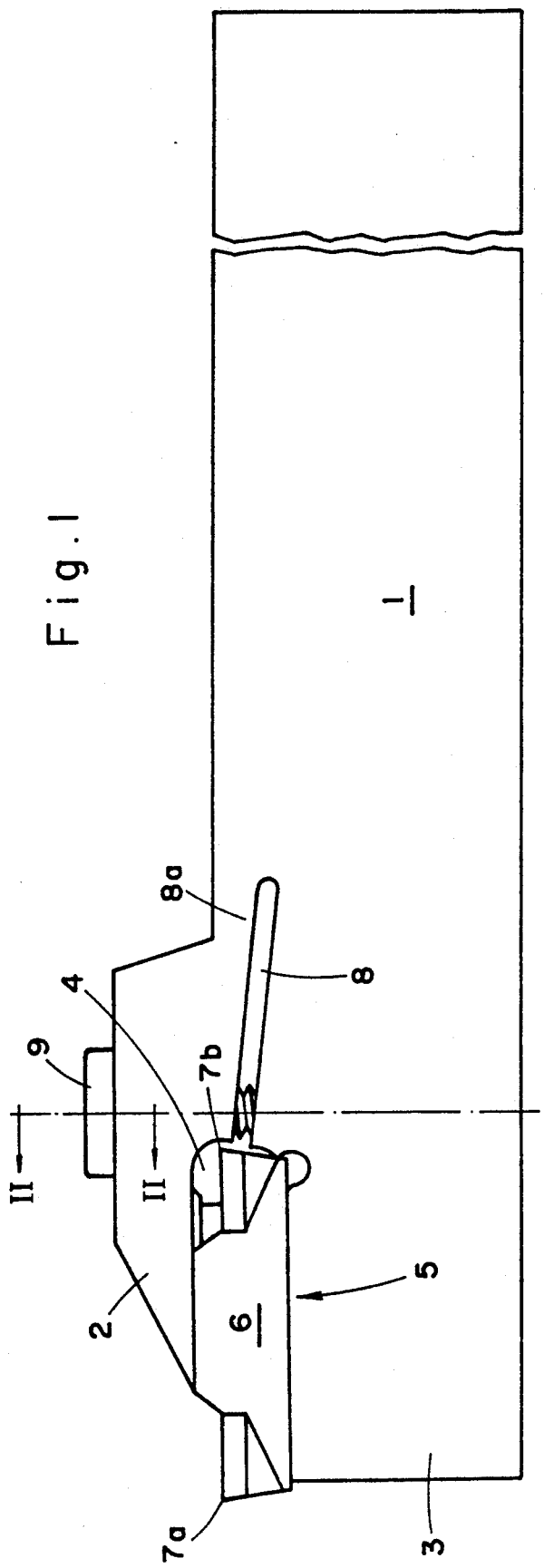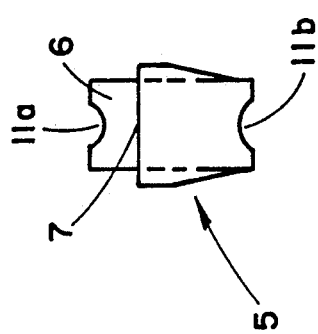

CUTTING TOOL ASSEMBLY

FIELD OF THE INVENTION

This invention relates to a comprising a replaceable cutting insert adapted to be held in an insert holder.

BACKGROUND OF THE INVENTION

Cutting tool assemblies of this kind are known wherein the replaceable cutting insert is formed with a main body portion having at one or both ends thereof terminal cutting edges. The insert holder is formed with a pair of clamping jaws defining between them an insert receiving recess. The insert is designed to be located within the recess with the operative cutting edge projecting outwardly and with the clamping jaws effectively gripping the insert at its body portion. The cutting tool assembly can be of the wedge-clamping type wherein the body portion is wedge-shaped as is the insert receiving recess, so that the insert is effectively wedge-clamped between the clamping jaws. Alternatively, one of the clamping jaws can be articulated with respect to the insert holder and mechanical means such as, for example, screw clamping means, are employed so as effectively to clamp the insert body portion between the clamping jaws.

In all cases, the effective clamping of the cutting insert in the insert holder must ensure that the insert is effectively retained against displacement under the cutting forces, and that the relative positioning of the insert with respect to the insert holder is maintained substantially invariant, both during cutting operations and also when inserts have to be replaced.

For this purpose, and in particular to ensure that the lateral position of the insert vis-à-vis the insert holder is maintained invariant both during cutting operations and upon replacement of inserts, it is known to provide the respective surfaces of the insert and clamping jaws which come into clamping relationship with each other (hereinafter "the clamping surfaces") with respectively elongated mating ribs and recesses of respectively convex and concave cross-sectional shapes. In this way, and when the insert is inserted into the insert receiving recess, the mating of the ribs within the recesses effectively inhibits lateral displacement of the insert with respect to the insert holder.

Thus, it is known in this connnection to form the ribs and recesses with respectively V-shaped cross-sectional shapes or, alternatively, with smoothly curved, arcuate cross-sectional shapes. It is found in practice, however, that, as a result of production tolerances, it is practically impossible to ensure sufficiently close matching of the convex rib within the concave recess. Thus, if the concave recess has significantly lesser dimensions than the convex rib, it will be clearly difficult for the rib to mate effectively within the recess. If, on the other hand, the concave recess is of significantly larger dimensions than the convex rib, it will be difficult, if not impossible, to ensure unique lateral positioning of the insert within the holder.

This problem is particularly aggravated in view of the fact that the cutting insert to be held within the holder is of very much harder material than that of the holder, and therefore the clamping surfaces of the clamping jaws tend to become rapidly worn, and this contributes to the difficulties in ensuring unique lateral dispositioning of the insert within the holder.

Whilst the difficulties referred to above occur with cutting tool assemblies used, for example, in parting operations wherein the cutting forces are radially directed with respect to the workpiece and are therefore directed along the longitudinal axis of the cutting insert, the difficulties become particularly acute where the cutting tool assembly is used also for laterally directed cutting operations such as, for example, turning and wherein the cutting insert is therefore subjected to laterally directed forces tending to displace the cutting insert in a lateral direction.

BRIEF SUMMARY OF THE INVENTION

It is an object of the present invention to provide a new and improved cutting tool assembly in which the above-referred-to difficulties are substantially reduced.

According to the present invention, there is provided a cutting tool assembly comprising a replaceable cutting insert having a body unit and at least one terminal cutting edge and an insert holder having a pair of clamping jaws, defining between them an insert receiving recess and constituting a clamping unit; said units being formed with respectively axially directed, convexly and concavely directed clamping surfaces which are symmetrically located about a longitudinally directed median plane, the clamping surfaces of the clamping jaws being adapted to mate with the clamping surfaces of the body unit; characterized in that Each clamping surface of a first of said units is of uniformly curved cross-sectional shape, whilst each clamping surface of a second of said units is of non-uniformly curved cross-sectional shape; the arrangement being such that when said body unit is clamped between said jaws the clamping surfaces of the units contact each other along discrete, axially directed locations which are symmetrically disposed with respect to and axially spaced from said median plane.

Preferably, the clamping surfaces of the first unit are of substantially circular cross-sectional shape of radius $r_1$, and the clamping surfaces of the second unit each comprise two axially directed side portions symmetrically located with respect to the median plane, and of substantially circular cross-sectional shape of radius $r_2$, where $r_1 < r_2$ and an axially directed central portion offset with respect to a plane defined by opposite longitudinal edges of said side portions and with respect to an adjacent clamping surface of the first unit.

Thus, with a cutting tool assembly in accordance with the invention, the clamping of the cutting insert within the insert holder results in the convexly-shaped clamping surface of the one being located within the concavely-shaped clamping surface of the other and, independently of variations in production tolerances, clamping contact between the clamping surfaces always takes place along known, pre-determined, axially-directed locations.

These axially directed locations can be substantially linear or, alternatively, can be constituted by axially directed surfaces located between the side portions and the central portion.

Preferably, the body unit of the cutting insert is formed with the concavely directed clamping surface and therefore constitutes the second unit referred to above, whilst the clamping surfaces of the clamping jaws are formed with the convexly directed surfaces and therefore constitute the second unit referred to above.

BRIEF SUMMARY OF THE DRAWINGS

Various embodiments of a cutting tool assembly in accordance with the present invention will now be described by way of example and with reference to the accompanying drawings, in which:

FIG. 1 is a side elevation of a cutting tool assembly in accordance with the present invention;

FIG. 2 is a front elevation of a cutting insert used in the cutting tool assembly shown in FIG. 1;

DETAILED DESCRIPTION OF PREFERRED EMBODIMENTS

Figure 4:
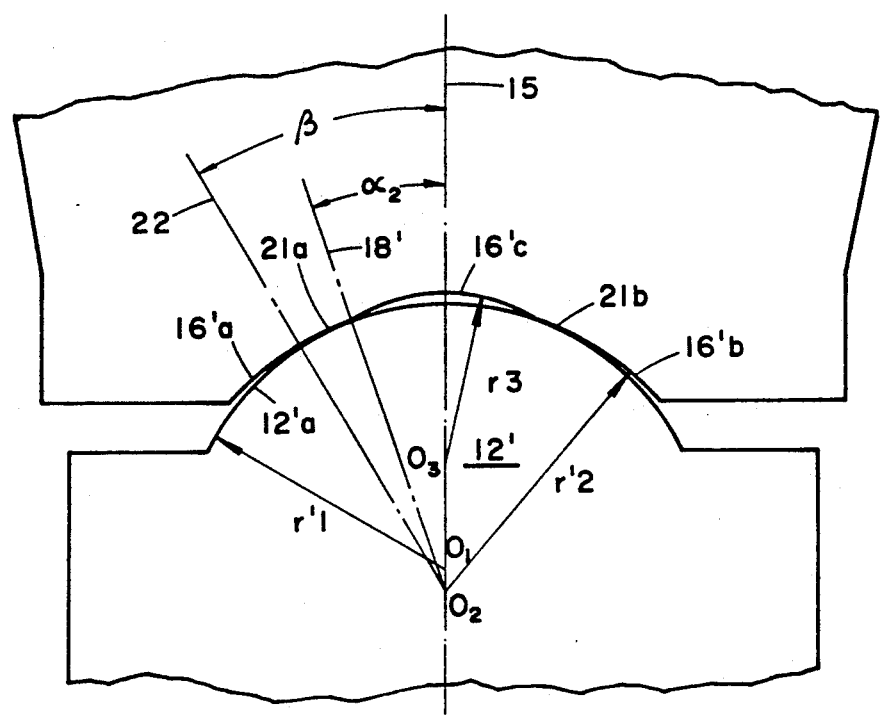
FIG. 4 is similar view on an enlarged scale illustrating a second embodiment for the respective clamping surfaces of the insert and clamping jaws.

As seen in the drawings, and particularly in FIG. 1 thereof, a cutting tool assembly comprises a tool holder 1 having a pair of integrally formed clamping jaws 2 and 3 constituting a clamping unit and which define between them an insert receiving recess 4 within which is located a cutting insert 5 having a central body unit 6 and a pair of terminal cutting edges 7a and 7b. The recess 4 communicates at an inner end thereof with an elongated slit 8. The end of the slit 8 remote from the recess 4 defines with an adjacent edge portion of the holder 1 a narrow neck 8a. A clamping screw 9 extends into the holder 1 through the clamping jaw 2 and the slit 8. It will be readily seen that, upon tightening of the clamping screw 9, the jaw 2 flexes downwardly about the narrow neck 8a so as effectively to clamp the insert 6 between the jaws 2 and 3.

As can be seen in FIG. 2 of the drawings, the body unit 6 of the insert 5 is formed with upper and lower, axially directed clamping surfaces 11a and 11b of concave, arcuately cross-sectional shapes.

Figure 3:
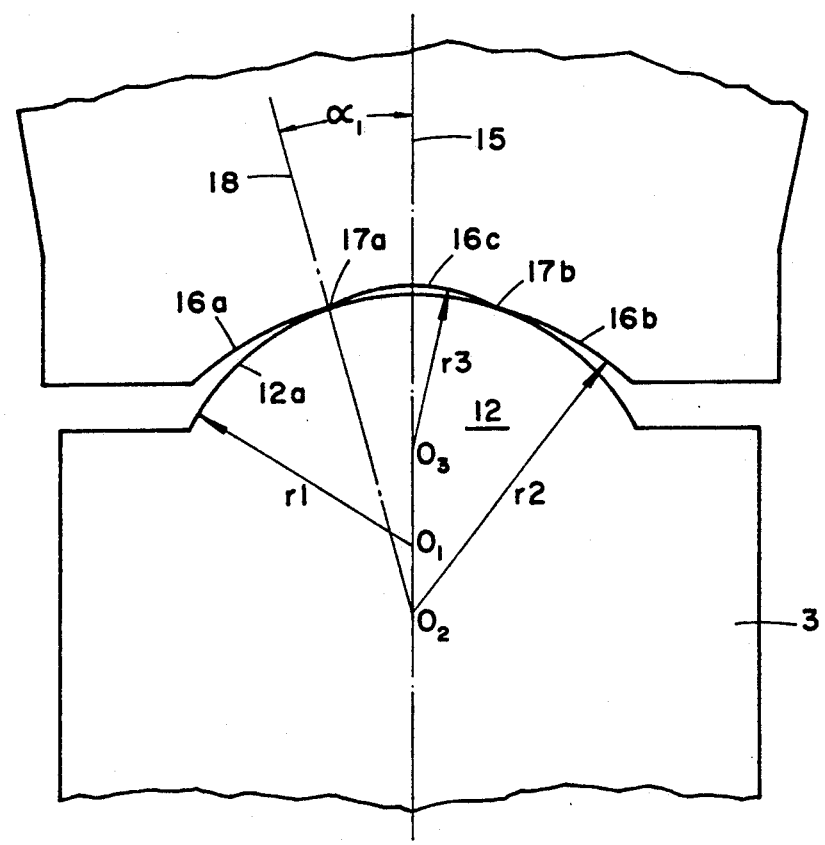
FIG. 3 is a front elevation on an enlarged scale illustrating one embodiment for the respective clamping surfaces of the insert and clamping jaws.

Corresponding longitudinally directed, clamping surfaces of the clamping jaws 2 and 3 are formed with longitudinally directed ribs seen in FIG. 3 as rib 12 and in FIG. 4 as rib 12'. (Only the rib 12, 12' of the jaw 3 is shown in FIGS. 4 and 5 but it will be appreciated that the construction of the corresponding ribs of the jaw 2, as well as the construction of the upper, elongated arcuate recess of the body unit 6, are similar.)

As seen in FIG. 3 of the drawings, the rib 12 of the jaw 3 is formed with a clamping surface 12a of substantially circular cross-sectional shape, having a radius $r_1$ extending from an origin $O_1$ lying on a median plane 15 of the insert 5. The arcuately curved, elongated recess 11b of the insert 5 is, on the other hand, constituted by a pair of side portions 16a and 16b which are symmetrically located with respect to the median plane 15 and are separated from each other by a central curved portion 16c. The side portion 16a merges with the central portion 16c via a linear axial location 17a, whilst the side portion 16b merges with the central portion 16c via an axial linear location 17b. The side portions 16a and 16b are of substantially circular shape having a radius $r_2$ extending from an origin $O_2$ located on the median plane 15. The central axial portion 16c is of substantially circular cross-sectional shape of a radius $r_3$ extending from an origin $O_3$ on the median plane 15. A radial plane 18 which extends from the origin $O_2$ through the axial location 17 defines an angle $\alpha_1$ with respect to the median plane 15.

As can be seen, $r_1 < r_2$, whilst $r_3 < r_1$. Thus, clamping contat between the arcuate rib 12 of the clamping jaw 3 and the arcuate recess 11 of the body unit of the insert 6 always takes place along the predetermined axial locations 17a and 17b. These locations are not affected by variations of production tolerances, seeing that the rib of the clamping jaw must always fit within the recess in the insert, seeing that the side portions of this recess are of higher radii of curvature than the radius of curvature of the rib. On the other hand, in view of the fact that the radius of curvature $r_3$ of the central portion 16c is less than the radius of curvature $r_1$ of the rib, the rib cannot penetrate into this central portion, which is effectively offset with respect to the rib surface. It will be realised that this offset central portion 16c does not necessarily have to be of circular cross-section, the sole requirement being that this central portion is offset with respect to a plane defined by the opposite longitudinal edges of the side portions 16a and 16b.

In the embodiment just described with reference to FIG. 3, the angle $\alpha_1$ should preferably lie between 15°15' to 20°, the optimum angle wherein the holder is made of steel and the insert of hard metal being 17.5°.

Whist in the embodiment shown in FIG. 3 the clamping surfaces of the insert and jaws contact along substantially linear, axial locations, in the embodiment shown in FIG. 4 contact is effected along intermediate axial surface locations of significant lateral extent.

In the case of this embodiment, the elongated rib of the jaw 3 is of radius $r'_1$ extending from origin $O_1$ whilst the elongated, arcuate recess of the insert 5 is, as before, provided with side portions 16'a and 16'b of radius $r'_2$ extending from origin $O_2$. A central portion 16'c is of radius $r'_3$ extending from origin $O_3$. Located on either side of the central portion 16'c and merging respectively with the side portions 16'a and 16'b are intermediate curved portions 21a and 21b of radius $r'_1$ extending from origin $O_1$, i.e. equal in curvature to the curvature of the longitudinally extending rib of the jaw 3.

A radial plane 18 extends from the origin $O_2$ to the line of contact of the intermediate portion 21a with a central portion 16'c and defines, with the median plane 15, an angle $\alpha_2$. A radial plane 22 extends from the origin $O_2$ to the axial line of merger of the side portion 16'a and the intermediate portion 21a and defines with the median plane 15 and angle $\beta$.

It will be realised that in the embodiment shown in FIG. 4 of the drawings, clamping contact between the elongated rib of the jaw 3 and the elongated recess of the insert 5 is now no longer along axially directed, linear locations, but rather along axially directed surfaces, albeit of limited lateral extent. Nevertheless, in this embodiment as in the embodiment described with reference to FIG. 3 of the drawings, the regions of contact between the respective clamping surfaces are predetermined and therefore the positioning of the insert in the holder can be accurately predetermined despite manufacturing tolerances. In the embodiment shown in FIG. 4 of the drawings, the angle $\alpha_2$ can range between 10° to 20°, whilst the angle $\beta$ can range between 15° to 50°.

Whilst in the embodiment specifically described above the clamping surface of the insert has been shaped as a concave, arcuate recess whilst that of the clamping jaw as a convex, arcuate rib, the invention is equally applicable to the situation wherein the clamping surfaces of the jaws are recessed whilst the clamping surfaces of the body unit of the insert are formed as convex, arcuate ribs.

We claim:

1. A cutting tool assembly comprising a replaceable cutting insert having a body unit and at least one terminal cutting edge and an insert holder having a pair of clamping jaws constituting a clamping unit and defining between them an insert receiving recess; said units being respectively formed with axially directed, convexly and concavely directed clamping surfaces which are symmetrically located about a longitudinally directed median plane, the clamping surfaces of the clamping jaws being adapted to mate with the clamping surfaces of the body unit; wherein each clamping surface of a first of said units is of a uniformly curved cross-sectional shape, while each clamping surface of a second of said units is of a non-uniformly curved cross-sectional shape defined by a plurality of interconnected curved surfaces; the arrangement being such that when said body unit is clamped between said jaws the clamping surfaces of the units contact each other along discrete, axially directed locations which are symmetrically disposed with respect to and axially spaced from said median plane.

2. A cutting tool assembly according to claim 1, wherein the clamping surfaces of said first unit are of substantially circular cross-sectional shape of radius $r_1$ and the clamping surfaces of the second unit each comprise two axially directed side portions symmetrically located with respect to said median plane of substantially circular cross-sectional shape and of radius $r_2$ where $r_1 < r_2$ and an axially directed central portion offset with respect to a plane defined by opposite longitudinal edges of said side portions and with respect to an adjacent clamping surface of said first unit.

3. A cutting tool assembly according to claim 2, wherein said central portion is of substantially circular cross-sectional shape of radius $r_3$ where $r_3 < r_1$.

4. A cutting tool assembly according to claim 2, wherein said first unit is constituted by said clamping jaws.

5. A cutting tool according to claim 4, wherein each side portion merges with the central portion at an axial location such that a radial plane extending from a centre of curvature of said side portion to said axial location defines an angle $\alpha$ with respect to said median plane, $\alpha$ lying within a range of substantially 15° to 20°.

6. A cutting tool assembly according to claim 5, wherein $\alpha$ substantially equals 17.5°.

7. A cutting tool assembly according to claim 2 or 3, wherein the side portions merge respectively with the central portion via relatively narrow axially directed intermediate portions having substantially circular cross-sectional shape of a radius substantially equal to $r_1$.

8. A cutting tool assembly according to claim 7, wherein said first unit is constituted by said clamping jaws and each axially directed intermediate portion merges with the central portion at an axial location such that a first radial plane extending from a centre of curvature of said side portion to said axial location defines an angle $\alpha$ with respect to said median plane and a second radial plane extending from said centre of curvature to an intermediate axial location on said intermediate portion defines an angle $\beta$ with respect to said median plane, $\alpha$ lying within a range of substantially 10° to 20°, whilst $\beta$ lies within a range of substantially 15° to 50°.

* * * * *